United States Patent [19]

Pyle

[11] 3,711,365

[45] Jan. 16, 1973

[54] METAL-CLAD LAMINATES

[75] Inventor: James J. Pyle, Coshocton, Ohio

[73] Assignee: General Electric Company

[22] Filed: Jan. 5, 1970

[21] Appl. No.: 774

Related U.S. Application Data

[63] Continuation-in-part of Ser. No. 512,291, Dec. 8, 1965, abandoned.

[52] U.S. Cl. ..................161/216, 156/272, 156/306, 161/247, 161/252, 161/412, 161/DIG. 7

[51] Int. Cl. ............................................B32b 15/08

[58] Field of Search......................161/216–219, 247, 161/252, 412, DIG. 7; 156/306, 272

[56] References Cited

UNITED STATES PATENTS 3,318,758 5/1967 Tell ....................................161/216
2,992,425 7/1961 Pratt................................161/217 X
3,231,655 1/1966 Larsen................................156/306
2,936,261 5/1960 Cole ...............................161/412 X
3,382,136 5/1968 Bugel et al...........................161/216

*Primary Examiner*—Robert F. Burnett
*Assistant Examiner*—Joseph C. Gil
*Attorney*—Frank L. Neuhauser, Oscar B. Waddell, Joseph B. Forman, Aurther V. Puccini and Howard I. Schlansker

[57] ABSTRACT

A metal clad plastic laminate is made by laying up a plurality of thin layers of irradiated polyolefin, such as polyethylene, and a metal layer is superimposed over at least one side of the lay-up. The resulting lay-up is then compressed.

6 Claims, 1 Drawing Figure

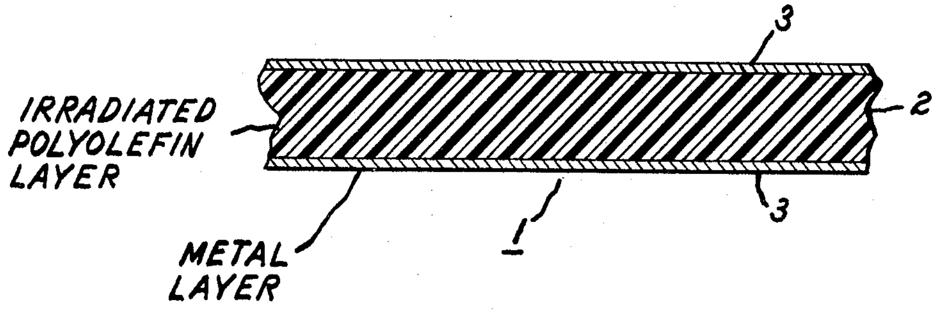
Inventor:
James J. Pyle,
by Howard I. Schlansker
His Attorney.

METAL-CLAD LAMINATES

This application is a continuation-in-part of application Ser. No. 512,291 filed Dec. 8, 1965, now abandoned.

This invention relates to metal-clad plastic laminates. In its more specific aspect, this invention relates to metal-clad plastic laminates exhibiting improved electrical and physical properties which are especially useful in printed circuitry.

Metal-clad plastic laminates are used extensively in the manufacture of printed circuitry, including printed circuit boards such as used in radio or television and microwave circuits such as microwave stripline. A conductive pattern is etched from the metal cladding thereby eliminating from the circuit wires or other connections and components. In microwave applications the attenuation for the circuit, which is the measure of loss of power, is determined primarily by the thickness of the plastic laminate and its dielectric constant and dissipation factor. In addition, the plastic laminate should be dimensionally stable, have very little water absorption, be solvent, resistant, and exhibit suitable physical strength and rigidity. Polyolefins such as polyethylene, polypropylene and the like, which have been irradiated to cross-link the polymer to a substantial degree, possess these desirable characteristics.

It has been proposed to manufacture the metal-clad plastic laminate from a slab of polyethylene, for example, which has been carefully machined or sanded to precise dimensional tolerances. The slab is then irradiated, and copper foil or other metal is bonded to one or both sides of the slab by heat and pressure, adhesives or other suitable means. Such laminates typically range in thickness from about 1/16 inch to 1/4 inch. Although the laminates made by this process generally possess good physical characteristics, it has been found that the dielectric constant, which is very important in microwave circuitry design, is not isotropic or uniform in all directions. It has been found impractical, however, to irradiate the polymer uniformly throughout its thickness so that the dielectric constant is isotropic. In addition, machining the plastic slab tends to set up mechanical stresses within the slab, which later in the manufacturing process of the printed circuit results in warpage and dimensional instability.

It is a primary object of the present invention, therefore, to provide metal-clad plastic laminates particularly suitable for microwave circuitry, which possess precisely controlled dimensions and isotropic dielectric properties, especially dielectric constant.

In accordance with the present invention, a metal-clad plastic laminate is made by laying up a plurality of thin layers of irradiated polyolefin, such as polyethylene. The polyolefin film has been subjected to a radiation dosage sufficient to effect substantial cross-linking thereby improving the properties of the polymer, as explained herein below in greater detail. A metal layer is superimposed over at least one side of the lay-up, and the resulting lay-up is then compressed under heat sufficient to fuse together the thin layers of irradiated film and bond the metal layer to the surface. The resulting laminate exhibits exceptionally good electrical and physical properties. Since each thin film component is irradiated uniformly, the laminate is characterized by a uniform dielectric constant, low dissipation factor and dimensional stability. The precise thicknesses of the laminate can be easily controlled simply by adjusting the thickness and/or number of films used in the lay-up. Further, costly machining processes are eliminated as are any adverse mechanical stresses produced by such machining.

Although the invention is described hereinafter with emphasis to the use of polyethylene, it should be understood that other polyolefins, such a polypropylene, as well as blends and copolymers of olefins are also applicable. Suitable materials with which ethylene polymer may be blended or copolymerized include, for example, butadiene, isobutylene, propylene, butenes, pentenes, acrylonitrile, vinyl acetate and acrylates. The term "polyolefin" as used herein and in the appended claims is intended to include all such variations. Typical polyethylenes useful in the invention include Alathon produced by DuPont, DYNH produced by Bakelite and TR polyethylenes produced by Phillips Petroleum. The density of the polyethylene may range from about 0.91 to 0.96, but the generally higher density polymer is preferred because it has a higher crystalline melting point and a slightly lower dielectric constant.

The polyethylene film is irradiated with high energy electrons in any well known manner as shown, for example, in U.S. Pat. No. 2,981,668. The degree of cross-linking of the polymer will depend upon the radiation dosage. Typically, the film is subjected to a dosage of from about 2 to 50 megaroentgens at electron voltages ranging from about $5 \times 10^4$ to $2 \times 10^7$ electron volts. The thickness of the polyethylene film may range from about 5 to 15 mils, and because relatively thin film is used, the irradiation is substantially uniform throughout. When cross-linking is sufficient, there is a substantial improvement in physical properties of the polymer as compared to thermoplastic polyethylene, especially at high temperatures, and the cross-linked polymer exhibits form stability. The degree of cross-linking may range from about 25 to 75 percent, and more preferably about 40 to 60 percent. The degree of cross-linking must be sufficient to obtain the improved properties, but these advantages are obtained within the maximum amount, and therefore it is not economical to exceed this amount.

While any metal cladding can be used in connection with the present invention, copper is preferred because of its desirable electrical characteristics. Typically, copper having a thickness of about 0.0014 inch weighing 1 oz. to the sq. ft. to a thickness of about 0.0028 inch weighing 2 oz. per sq. ft. is used, although other thicknesses can be employed as desired. It is conventional to pretreat the copper as with an oxide, phosphate or sulphate material to enhance bonding of the copper layer to the polyethylene surface.

In the manufacture of the metal-clad plastic laminate, a plurality of sheets of irradiated polyethylene film and the copper sheet are laid-up in a stack. The lay-up is then placed between steel plates or press pans, and the composition is then subjected to a pressure of from about 100 to 1500 psi at a temperature of from about 120° to 250° C for hold times ranging up to about 30 minutes.

There is illustrated in the accompanying drawing a partial cross-section view of a metal-clad laminate produced in accordance with the present invention. Laminate 1 comprises a polyethylene layer or core 2 prepared from a plurality of thin irradiated films. Thin copper layers 3 are bonded to each surface of the core.

The following examples further illustrate the invention. In the examples, the density of the polyethylene was 0.9440 ± 0.0008. The tensile strength was about 2500 psi, the elongation about 15 percent and the tensile modulus at 23°C about 150 psi. The coefficient of thermal expansion was from about 25° to 75°C, was about 12.6 in./in./°C × $10^{-5}$ and the thermal conductivity was about 1.85 but/hr./sq.ft./in. thick/°F, and the Rockwell hardness ranged from about 55 to 58. The table shows the number of sheets and sheet thickness of polyethylene film used, the weight of copper used, and the laminating hold temperature, pressure and time. The final thickness of the finished laminate is set forth in the last column. In Examples 6 through 10, the column headed "No. of Sheets" is expressed in grams of weight of various thickness of film shown laid up at random to weight, because it is more convenient and precise to prepare these materials on a weight basis.

| Ex. | No. of sheets | Sheet thickness (Mils) | temp. °C. | Pressure (psi) | Time (Min.) | cu oz. | Final thickness (mils) |
|---|---|---|---|---|---|---|---|
| 1 | 12 | 10 | 140 | 625 | 5 | 1 | 125 |
| 2 | 12 | 10 | 180 | 780 | 10 | 1 | 125 |
| 3 | 11 | 10 | 200 | 600 | Momentary | 2 | 113 |
| 4 | 12 | 10 | 200 | 600 | 15 | 2 | 124 |
| | 3 | 2 | | | | | |
| 5 | 6 | 10 | 200 | 600 | 15 | 2 | 247 |
| 6 | 5372 g. | | 175 | 550 | 15 | 2 | 247 |
| 7 | 5375 g. | 5/11/13 | 175 | 600 | 22 | 2 | 245 |
| 8 | 250 g. | 5/11/13 | 170 | 450 | 15 | 1 | 62 |
| 9 | 514 g. | 5/11/13 | 170 | 400 | 15 | 1 | 120 |
| 10 | 252 g. | 5/11/13 | 170 | 450 | 15 | 1 | .061 |

The polyethylene fused together to form a substantially homogeneous layer which would not delaminate even upon being exposed at length to boiling toluene. The peel strength of the copper from the plastic layer ranged from about 3 to 10 pounds per inch, which is more than adequate for printed circuitry and the water absorption was found to be less than 0.05 percent, both as measured according to A.S.T.M. D–229. The dissipation factor was less than 0.00025; the dielectric constant was 2.327 ± 0.01 and was uniform in all directions or isotropic; the surface resistivity of the material was about 9 × $10^6$ megohms and the volume resistivity was about 6.4 × $10^7$ megohms; and the perpendicular short-time dielectric breakdown in oil was 1100 volts/mil for 1/16 inch material, 650 volts per mil for 1/8 inch material, and 350 volts per mil for 1/4 inch material; all tests being measured in accordance with A.S.T.M. D–150. The lengthwise warp as well as the crosswise warp was less than 0.5 percent and the dimensional change at both lengthwise and crosswise was less than 0.6 mil per inch. The lengthwise and crosswise shrinkage was less than 2 mils per inch.

It will be observed that metal-clad laminates of varying thickness may be prepared which exhibit an isotropic dielectric constant and low dissipation factor as well as other excellent electrical and physical properties.

Having described my invention, and certain embodiments thereof, I claim:

1. A metal-clad laminate adaptable for use in printed circuitry comprising a plurality of fused thin sheets of irradiated polyolefin, each of said sheets having been subjected to an irradiation dosage sufficient to effect 25 – 75 percent cross-linking, and superimposed on at least one side thereof a metal layer, said laminate characterized by a substantially uniform dielectric constant, low dissipation factor and dimensional stability.

2. A laminate as in claim 1 in which said polyolefin is polyethylene.

3. A laminate as in claim 1 in which said metal is copper.

4. The metal-clad laminate of claim 1 wherein said metal layer is superimposed on each side of said laminate.

5. Metal-clad laminate of claim 1 wherein said polyolefin is irradiated at a dosage sufficient to effect 40 – 60 percent cross-linking.

6. A metal-clad laminate adaptable for use in printed circuitry comprising a plurality of fused thin sheets of irradiated polyethylene, each of said sheets having been subjected to an irradiation dosage sufficient to effect 40 – 60 percent cross-linking, and superimposed on at least one side thereof a copper layer, said laminate characterized by a substantially uniform dielectric constant, low dissipation factor, and dimensional stability.

* * * * *